(12) United States Patent
Bhatt

(10) Patent No.: US 8,433,135 B2
(45) Date of Patent: Apr. 30, 2013

(54) IMAGE ADJUSTMENT USING EXTENDED RANGE CURVES

(75) Inventor: Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 735 days.

(21) Appl. No.: 12/610,852

(22) Filed: Nov. 2, 2009

(65) Prior Publication Data

US 2011/0103685 A1     May 5, 2011

(51) Int. Cl.
    *G06K 9/00* (2006.01)
(52) U.S. Cl.
    USPC .......................................................... 382/168
(58) Field of Classification Search ........... 382/162–172
    See application file for complete search history.

(56) References Cited

U.S. PATENT DOCUMENTS

| 5,239,378 A * | 8/1993 | Tsuji et al. ................... 348/625 |
| 2002/0015447 A1* | 2/2002 | Zhou ......................... 375/240.25 |
| 2003/0103057 A1* | 6/2003 | Graves et al. ................ 345/589 |

* cited by examiner

*Primary Examiner* — Alex Liew
(74) *Attorney, Agent, or Firm* — Fish & Richardson P.C.

(57) ABSTRACT

A digital image having associated tonal data, including tonal data in an extended range above a normalized value of 1.0, can be accessed. An extended range curve tool corresponding to the digital image can be instantiated, the extended range curve tool including a curve defining a relationship between input tonal values and output tonal values, wherein at least a portion of the input tonal values and output tonal values are associated with the extended range. An extended range histogram also can be generated based on the tonal data associated with the digital image, the extended range histogram including data corresponding to the extended range. Further, the extended range histogram can be presented in conjunction with the extended range curve tool. Additionally, user input specifying an adjustment to at least a portion of the curve can be received and a modified curve can be presented in response to the specified adjustment.

26 Claims, 8 Drawing Sheets

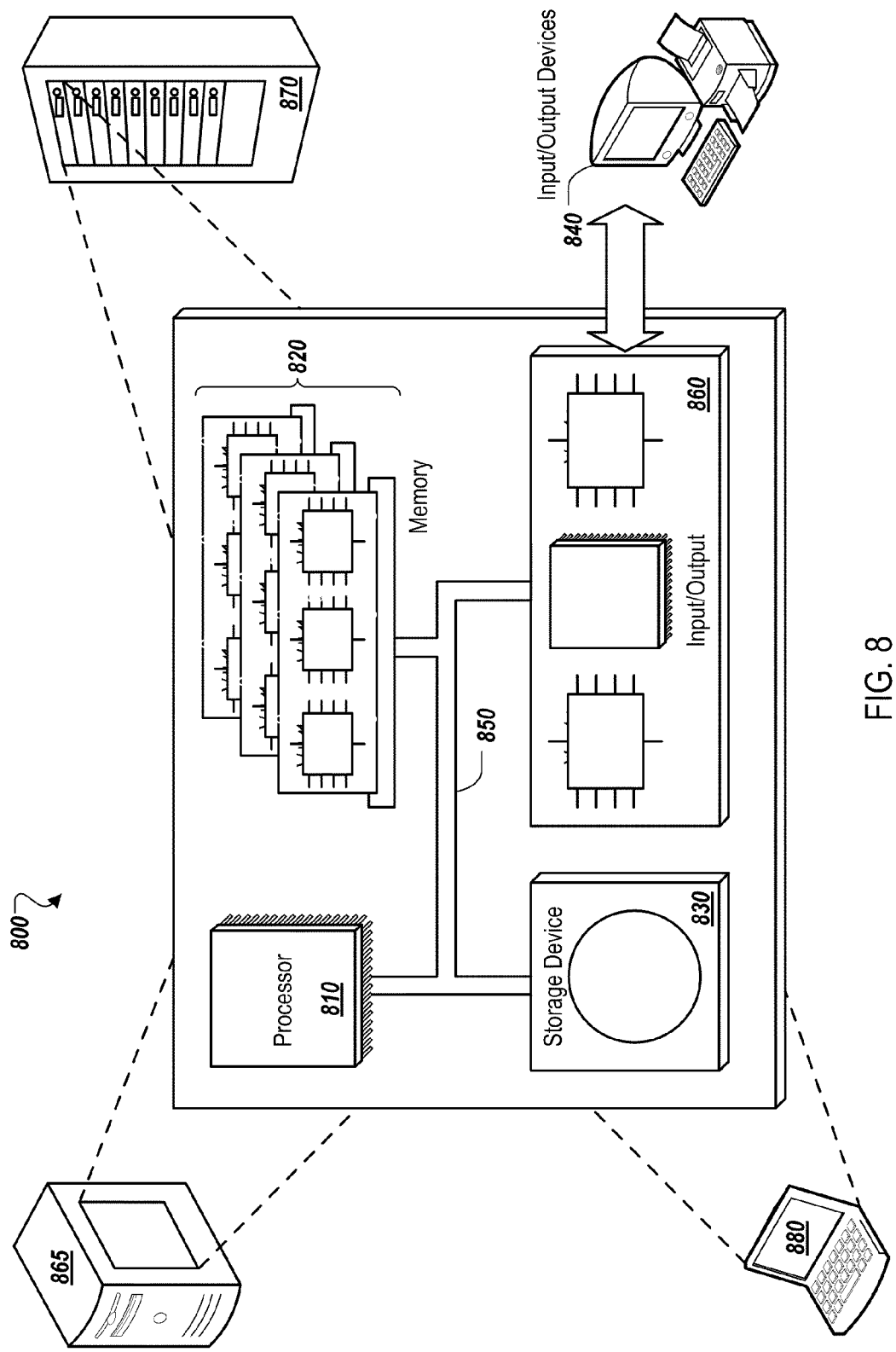

IMAGE ADJUSTMENT USING EXTENDED RANGE CURVES

TECHNICAL FIELD

The present disclosure relates to analyzing and processing digital image data, including extended range data, and to graphical tools for receiving tonal adjustment input and for outputting graphical information indicating tonal changes to an image.

BACKGROUND

The color balance of a digital image can be manually adjusted through a user interface element, such as an exposure control, or by specifying one or more reference values, such as a black point, a white point, or a gray point. These adjustments modify one or more tone values for an entire image, instead of altering pixels at a specific location within an image. Thus, visual aspects of a digital image, such as contrast and brightness, can be adjusted through a small number of inputs.

A curve is an image adjustment tool that can be used to graphically represent an image characteristic, such as tonality. The curve can be represented in a two-dimensional format, such as a chart with an x-axis (abscissa) and a y-axis (ordinate). For instance, the x-axis can represent the input values (or levels) associated with an image and the y-axis can represent the corresponding output values.

The graph in which the curve is represented further can be arranged such that the zero point on an axis represents pure black, or the black point. Also, a value of one on an axis can represent pure white, or the white point. With reference to an eight-bit color scheme, a value of zero can correspond to pure black and a value of 255 can correspond to pure white. In a normalized graph, the curve can be a diagonal line that extends from the origin (0, 0) to the intersection of the maximum value at (1, 1). Thus, for each point along the curve, the input value equals the output value and there is no change to the tonal values of the image.

Either or both of the black point and the white point can be adjusted toward the center of an axis. For instance, moving the white point toward the center of the x-axis causes all of the input values to the right of the adjusted white point to be pure white output values, thereby increasing the contrast in the image. Conversely, moving the white point toward the center of the y-axis causes all output values to be less than pure white, including pure white input values. As a result, contrast in the image is reduced. Adjusting the black point with respect to an axis also affects the level of contrast in an image. Moving the black point toward the center of the x-axis causes more output values to be pure black, which decreases brightness. Further, moving the black point toward the center of the y-axis means that no output values will be pure black, which increases brightness. In one technique, contrast can be increased by setting the black point just below the darkest tones included in the image and by setting the white point just above the lightest tones in the image.

Further, the curve itself can be modified at one or more points. For instance, an anchor (or knot) can be defined on the curve and can be used to pull the curve up, causing at least a portion of the input values to have higher corresponding output values. As a result, brightness can be increased for at least a portion of the image. An anchor on the curve also can be used to pull the curve down, causing at least a portion of the input values to have lower corresponding output values. As a result, brightness can be reduced for at least a portion of the image.

SUMMARY

Tonal values corresponding to an image, including tonal values associated with an extended range of input-output values, can be graphically represented and adjusted using a curves tool. Images can be represented using a high-bit image format, e.g. RAW image format, that can include more image data than an 8-bit image format. The image data outside of the standard range of 0.255 for an 8-bit image, or the normalized range of 0.1, can be associated with an extended range above 255, or 1, respectively.

A curves tool can be configured to support an extended range of input values and output values, such as a range from 0.2 or 0.4. The operable range of values supported by the curves tool can be set to any positive value. Further, at least a portion of the curve in the extended range can be modified to define one or more tonal adjustments with respect to values in the extended range.

The present inventors recognized a need to permit adjusting tonal values associated with an image, including tonal values in an extended range, by adjusting a curve. The present inventors also recognized a need to present a corresponding extended range histogram based on tonal data associated with the image. Further, a need to provide data indicative of one or more tonal adjustments to a curve for use in updating an output histogram also was recognized.

The present inventors also recognized a need to permit a user to select or specify a range, including an extended range, for use with a curves tool. Further, the present inventors recognized a need to present only a portion of the curve corresponding to an identified range, such as in a higher resolution. The need to permit selection and adjustment of a particular channel, such as RGB (red, green, blue) or luminance, also was recognized. Further, the present inventors recognized the need to present separate curves corresponding to multiple channels, e.g. separate color channels, in conjunction with corresponding histograms.

Additionally, the present inventors also recognized the need to permit configuring the curves tool to use a particular color space, such as a gamma-corrected color space or a linear color space. Further, the present inventors recognized the need to permit instantiating multiple instances of a curves tool for use in adjusting a single image, wherein a first instance of the curves tool can be configured to use a linear color space and a second instance of the curves tool can be configured to use a gamma-corrected color space. Accordingly, the techniques and apparatus described here implement algorithms for adjusting one or more tonal values associated with a digital image using an extended range curves tool.

In general, in one aspect, the techniques can be implemented as a computer program product, encoded on a computer-readable medium, operable to cause data processing apparatus to perform operations including accessing a digital image have associated tonal data, including tonal data in an extended range greater than a normalized value of 1.0, instantiating an instance of an extended range curve tool corresponding to the digital image that includes a curve defining a relationship between input tonal values and output tonal values, wherein at least a portion of the input tonal values and output tonal values are associated with the extended range, generating an extended range histogram based on the tonal data associated with the digital image, the extended range histogram including data corresponding to the extended range, and presenting the extended range histogram in conjunction with the instance of the extended range curve tool.

The techniques also can be implemented to be further operable to cause data processing apparatus to perform operations including selectively configuring the curve to correspond to a type of grayscale processing, such as by selecting a luminance channel or an equal weight RGB channel. Further, the techniques can be implemented to be further operable to cause data processing apparatus to perform operations including presenting, in the instance of the extended range curve tool, another curve that corresponds to a single color channel. Additionally, the techniques can be implemented to be further operable to cause data processing apparatus to perform operations including receiving user input specifying an adjustment to at least a portion of the curve and presenting a modified curve in response to the specified adjustment.

The techniques also can be implemented to be further operable to cause data processing apparatus to perform operations including receiving user input specifying a portion of the curve to be viewed in more detail and presenting an expanded view of the specified portion of the curve. Further, the techniques can be further operable to cause data processing apparatus to perform operations including receiving, in the expanded view, user input indicating an adjustment to at least a portion of the curve. Also, the techniques can be further operable to cause data processing apparatus to perform operations including configuring the curve type to be either of linear and gamma-corrected. Additionally, the techniques can be further operable to cause data processing apparatus to perform operations including instantiating a second instance of the extended range curve tool corresponding to the digital image, wherein at least one configuration parameter differs between the instances of the extended range curve tool.

In general, in one aspect, the techniques can be implemented as a computer program product, encoded on a computer-readable medium, operable to cause data processing apparatus to perform operations including accessing a digital image have associated tonal data, generating an extended range curve tool corresponding to the digital image, the extended range curve tool having a curve defining a relationship between input tonal values and output tonal values, including tonal values associated with an extended range beyond a normalized value of 1.0, receiving user input specifying a configuration setting corresponding to the extended range curve tool, and presenting the extended range curve tool in accordance with the specified configuration setting.

Further, the techniques can be implemented such that the extended range curve tool is included in a tool strip having at least one additional image adjustment tool. Also, the techniques can be further operable to cause data processing apparatus to perform operations including generating an output histogram based at least in part on output tonal values associated with the extended range curve tool and presenting the output histogram in the tool strip. Additionally, the techniques can be implemented to be further operable to cause data processing apparatus to perform operations including generating an extended range histogram in accordance with tonal data associated with the digital image and presenting the extended range histogram in the extended range curve tool.

The techniques also can be implemented such that the instructions operable to cause data processing apparatus to receive user input specifying a configuration setting are further operable to perform operations including selectively configuring the curve to correspond to a luminance channel or an equal weight RGB channel. Further, the techniques can be implemented such that the instructions operable to cause data processing apparatus to receive user input specifying a configuration setting are further operable to perform operations including receiving user input selecting one of several predetermined tonal value range settings. Also, the techniques can be implemented to be further operable to cause data processing apparatus to perform operations including receiving user input specifying an adjustment to at least a portion of the curve and presenting a modified curve in response to the specified adjustment. Additionally, the techniques can be implemented to be further operable to cause data processing apparatus to perform operations including associating the specified adjustment with a brush tool. The techniques also can be implemented such that the brush tool is configured to brush the specified adjustment out of the digital image.

In general, in another aspect, the techniques can be implemented to include accessing a digital image have associated tonal data, including tonal data in an extended range greater than a normalized value of 1.0, instantiating an instance of an extended range curve tool corresponding to the digital image that includes a curve defining a relationship between input tonal values and output tonal values, wherein at least a portion of the input tonal values and output tonal values are associated with the extended range, generating an extended range histogram in accordance with the tonal data associated with the digital image, the extended range histogram including data corresponding to the extended range, and presenting the extended range histogram in conjunction with the instance of the extended range curve tool.

The techniques also can be implemented to include receiving user input specifying an adjustment to at least a portion of the curve, generating a modified curve in response to the specified adjustment, and presenting the modified curve in the instance of the extended range curve tool. Further, the techniques can be implemented to include generating an output histogram based at least in part on output values associated with the instance of the extended range curve tool and presenting the output histogram and the instance of the extended range curve tool separately. Also, the techniques can be implemented to include receiving user input configuring the curve to correspond to a luminance channel or an equal weight RGB channel. Additionally, the techniques can be implemented to include configuring the curve type to be either of linear and gamma-corrected.

The techniques also can be implemented to include receiving user input specifying a portion of the curve to be viewed in more detail and presenting, in the instance of the extended range curve tool, an expanded view of the specified portion of the curve. Further, the techniques can be implemented to include receiving, in the expanded view, user input indicating an adjustment to at least a portion of the curve and modifying the curve in response to the indicated adjustment, including at least a portion of the curve not presented in the expanded view. Also, the techniques can be implemented to include instantiating a second instance of the extended range curve tool having a second curve corresponding to the digital image, wherein at least one configuration parameter differs between the instances of the extended range curve tool and receiving user input, in the second instance of the extended range curve tool, specifying an adjustment to at least a portion of the second curve. Additionally, the techniques can be implemented to include associating the specified adjustment with a brush tool configured to brush the specified adjustment into one or more portions of the digital image.

The techniques described in this specification can be implemented to realize one or more of the following advantages. For example, the techniques can be implemented such that extended range image data can be displayed and adjusted in a curves tool. The techniques also can be implemented to reduce or eliminate the clamping of image data at the end of a specified range by extending the range to encompass additional values. Further, the techniques can be implemented to include presenting an extended range histogram in conjunction with an extended range curves tool to graphically depict the tonal distribution corresponding to an associated image. The techniques also can be implemented to provide the ability to adjust only a portion of the tone curve, including a portion that at least partially corresponds to the extended range. Accordingly, fine-grain adjustment of tonal data within the extended range can be performed.

Further, the techniques can be implemented to permit adjusting tonal data corresponding to an individual color channel, i.e. red, green, or blue. Thus, the balance between separate colors can be adjusted. The techniques also can be implemented to permit selectively adjusting tonal values with respect to the luminance channel or an RGB channel. Additionally, the techniques can be implemented to permit instantiating multiple instances of a curves tool with respect to a single image, such that tonal adjustments can be successively performed with respect to different color spaces, e.g. gamma-corrected and linear color spaces.

The details of one or more implementations are set forth in the accompanying drawings and the description below. Other features and advantages will be apparent from the description and drawings, and from the claims.

BRIEF DESCRIPTION OF THE DRAWINGS

FIG. 8 shows an exemplary computing system for implementing an extended range curve tool.

Like reference symbols indicate like elements throughout the specification and drawings.

DETAILED DESCRIPTION

An image represented using a high-bit image format, such as the RAW image format, can include more data than a lower-bit image format, such as JPEG. When an image represented using a high-bit image format is depicted, such as in a histogram, using a standard range, e.g. 0.1, all of the image data corresponding to a value of 1 or greater is represented as a single spike at the value 1. Also, extended range data can be generated for a lower-bit image format through operations such as image processing. For example, manipulation of an exposure control can produce image data outside of the standard range. The resulting extended range data, when represented using a standard range histogram, also can appear as a spike. By extending the range, the amplitude of the spike can be decreased and the values above 1 can be distributed over the extended range. The image data in the extended range can then be processed more accurately. In some instances, negative color values also can be associated with an image. Thus, the range also can be extended to values below 0, such as −1.

Figure 1:
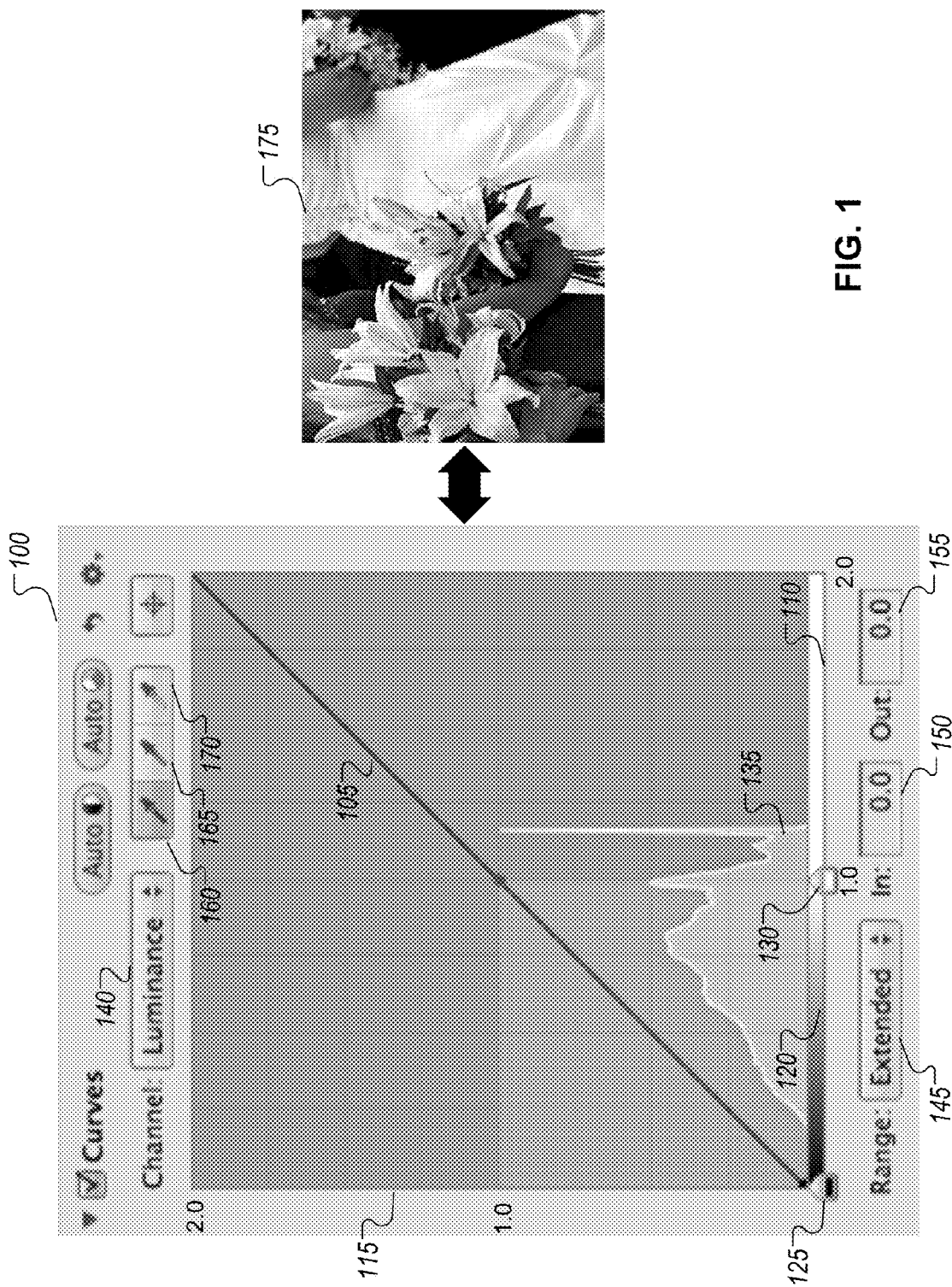
FIG. 1 shows an exemplary extended range curve tool with a corresponding extended range histogram.

FIG. 1 shows an exemplary extended range curve tool with a corresponding extended range histogram. The extended range curve tool 100 can be used to specify one or more adjustments to the tonal values of a corresponding image 175, such as to customize contrast within the image 175.

A reference curve 105 can be presented in extended range curve tool 100. Reference curve 105 can be represented as a diagonal line, indicating that each input value, e.g. each point along the x-axis 110, has an equivalent output value, e.g. a corresponding point along the y-axis 115. For example, an input value of 1.2 along x-axis 110 maps to a corresponding output value of 1.2 along y-axis 115. The selectable range of input and output values of extended range curve tool 100 exceeds the standard range of 0.1. For instance, extended range curve tool 100 can be configured to have a range of 0.2 and x-axis 110 and y-axis 115 thus can represent values between 0 and 2, inclusive.

Extended range curve tool 100 also can include a tonal range bar 120, which graphically depicts the entire tonal range from black to white, including a low range, a mid-range, and a high range. Further, a black point indicator 125 and a white point indicator 130 can be associated with tonal range bar 120. Black point indicator 125 can be positioned at any point along tonal range bar 120 that is to the left of white point indicator 130. Each input value along x-axis 110 that is aligned with or to the left of black point indicator 125 represents pure black. Similarly, each input value along x-axis 110 that is aligned with or to the right of white point indicator 130 represents pure white. White point indictor 130 can be set equal to the maximum value in the range, including values in the extended range. In some implementations, a gray point indicator (not shown) also can be associated with tonal range bar 120. Additionally, a black point sampler 160, a gray point sampler 165, and a white point sampler 170 can be included in extended range curve tool 100. Each sampler can be used to select a tonal value in image 175 associated with the extended range curve tool 100 to set the corresponding black point, gray point, or white point.

An extended range histogram 135 for the image associated with extended range curve tool 100, e.g. image 175, also can be presented with the tool. Extended range histogram 135 can graphically depict the distribution of tones in image 175, including the distribution of tones within the extended range, i.e. beyond 1. Extended range histogram 135 can represent the input values to extended range curve tool 100, which correspond to the initial values of the associated image. Thus, extended range histogram 135 can remain static despite the occurrence of one or more tonal adjustments implemented using extended range curve tool 100. In some implementations, extended range histogram 135 can be updated in response to one or more adjustments to the associated image performed through tools other than extended range curve tool 100, such as an exposure tool or a levels tool.

Additionally, extended range curve tool 100 can include a channel selector 140 and a range selector 145. Channel selector 140 and range selector 145 each can be implemented using any interface device, including a drop down menu, a scrollable list, a toggle box, or radio buttons. Channel selector 140 can be used to specify the channel, e.g. luminance or RGB, to be processed in extended range curve tool 100. The luminance channel represents the weighted sum of linear RGB components. Thus, when the luminance channel is selected, a tonal adjustment can be applied in differing degrees to each separate color, red, green and blue. As a result, a color balance existing before the tonal adjustment is applied can be more closely maintained and color skew can be reduced. Alternatively, the RGB channel can be configured to use equal weighting, such that the same degree of change is applied to each separate color in response to a tonal adjustment. The selected channel can be changed at any time during the operation of extended range curve tool 100.

Range selector 145 can be used to select the range to be displayed in extended range curve tool 100. Range selector 145 can include at least one extended range setting and also can include a standard range setting. The standard range setting can be selected to view and/or process tonal data in the standard range. When the standard range setting is selected, the input and output values corresponding to x-axis 110 and y-axis 115 can be in the range of 0.1. Any image data having a value higher than the maximum range, i.e. 1, can be represented as having the maximum value.

An extended range setting can be selected to view and/or adjust tonal data in both the standard range and the extended range. Because the actual value of data in the extended range can be displayed, instead of presenting a multi-valued spike, the extended range data also can be more accurately adjusted. Further, the increased granularity provided by displaying the extended range also permits the entry of finer tuned tonal adjustments. In some implementations, multiple extended range settings can be provided, e.g. 0 . . . 1.5, 0 . . . 2, and 0 . . . 4. One or more settings including negative extended range values also can be provided. Alternatively or additionally, in some other implementations, a custom extended range can be specified, such as using a text box, a slider, or a selection box. Additional range settings also can be accessible through range selector 145. For example, a shadow range setting can be included that depicts low and mid-range data, such as in the range between 0 and 0.5. Further, a highlight range setting can be included that depicts high range data, such as data with a value greater than 0.75. As a result, a range setting can be selected in extended range tool 100 to provide a view of a particular tonal range. In some implementations, the extended range curve tool 100 can include a color space selector (not shown). The color space selector can be configured to permit a user to select a particular color space, e.g. ProPhoto, for use in processing.

Additionally, an input value display 150 and an output value display 155 can be included in extended range curve tool 100 to indicate the values corresponding to a point on reference curve 105. For example, a tonal adjustment can be made by generating a modified curve, such as by pulling curve 105 up or down. The amount of change at a particular point, such as an anchor, can be indicated during and/or after the adjustment by the values displayed in input and output value displays 150 and 155. Further, the corresponding input and output values for any point on curve 105 can be displayed in input and output value displays 150 and 155 by selecting that point, such as through a cursor.

Figure 2:
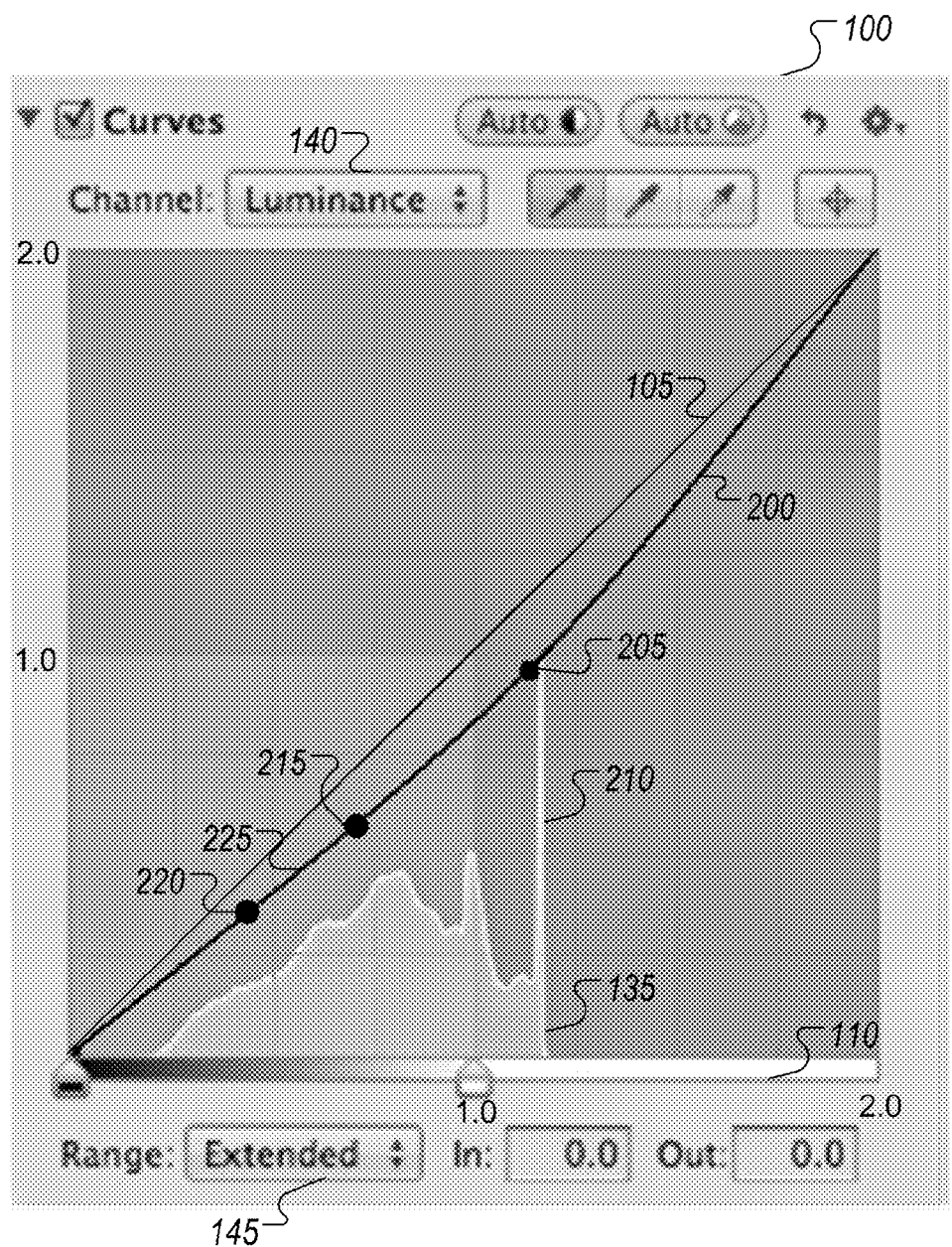
FIG. 2 shows an exemplary modification of an extended range curve.

FIG. 2 shows an exemplary modification of an extended range curve. Extended range curve tool 100 can be configured to receive user input, such as through a cursor controlled by an input device, e.g. a mouse, a joystick, a touch screen, a touch pad, a keyboard, or a key pad. The user input can cause the selection of one or more configuration parameters, such as in connection with channel selector 140 and range selector 145. The configuration parameters can affect the presentation of extended range curve tool 100 as well as the characteristics of a tonal adjustment.

Further, the user input can specify one or more adjustments to curve 200. Adjustment of curve 200 can be performed, e.g., by selecting an anchor on curve 200 and moving the anchor up or down relative to its current position. For instance, anchor 205 can be selected on curve 200, e.g. initially corresponding to an input value and an output value of 1.2. Anchor 205 can be moved toward x-axis 110, such as by dragging anchor 205 downward. Although the input value corresponding to anchor 205 remains equal to 1.2, the corresponding output value after the downward adjustment can be lower, e.g. 0.95. As a result, one or more tonal values in the extended range, i.e. values above 1.0, can be shifted into the standard range. Further, when anchor 205 is adjusted, other points along curve 200 also can be adjusted downward, with the magnitude of the adjustment decreasing with distance from anchor 205. An anchor on curve 200 can be adjusted to the highest value in the range, the lowest value in the range, or any point in between. Additionally, reference curve 105 can continue to be displayed, such that one or more changes to curve 200 can be identified.

Histogram 135 represents the input values corresponding to the initial state of the associated image, e.g. image 175. Thus, histogram 135 can remain unchanged despite one or more tonal adjustments to curve 200. For instance, the amplitude of spike 210 near the value of 1.2 can remain unchanged, even though curve 200 has been adjusted in the corresponding region.

A tonal adjustment also can be at least partially limited to a specific portion of curve 200. If one or more anchors have been defined along curve 200, an adjustment can be associated with the modified portion of curve 200 that is located between the anchor and an end point or between two anchors. To remain continuous, a portion of curve 200 opposite an anchor can be displaced. However, the amount of displacement can be reduced relative to the displacement that would have occurred absent the anchor. For instance, a curve segment 225, e.g. corresponding to a mid-range of tonal values, can lie between anchors 215 and 220 on curve 200. An adjustment to curve segment 225 can be defined such that its affect on any remaining portion of curve 200 is reduced or eliminated. Thus, a tonal adjustment can be applied to a targeted tonal range while decreasing the affect on any other portion of curve 200. Further, by defining one or more anchors on curve 200, one or more adjustments can be made to produce a complex curve. Alternatively, a targeted adjustment to a particular tonal range can be defined in another instance of an extended range curve tool and selectively applied, e.g. through brushing, to one or more portions of an image. Thus, a tonal adjustment that would unacceptably or undesirably distort one or more portions of curve 200 can be separately performed. For instance, the tonal adjustment can be applied to one or more pixels that do not contain tonal values distorted by the adjustment.

Figure 3:
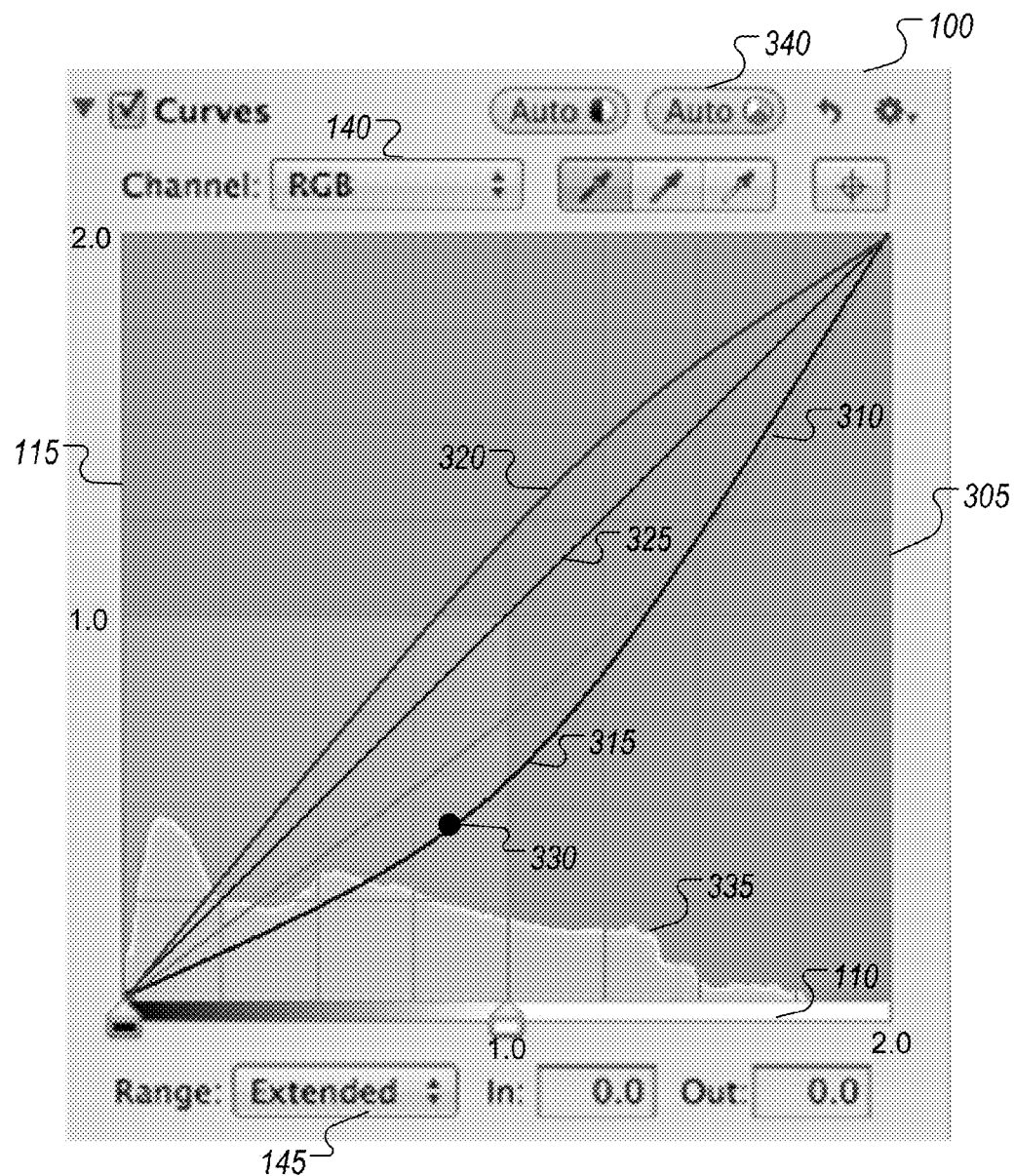
FIG. 3 shows an exemplary extended range curve tool including separate color curves.

FIG. 3 shows an exemplary extended range curve tool including separate color curves. Extended range curve tool 100 can be configured to present one or more separate color curves in a curve display area 305, such as green curve 310, blue curve 315, and red curve 320. For instance, user input can be received specifying one or more individual colors, i.e. red, green, and/or blue, for which a separate color curve is to be displayed. Alternatively or additionally, separate color curves corresponding to all three colors can be displayed in response to a received selection or command, such as actuation of auto color button 340. In some implementations, a luminance curve 325 also can be displayed in conjunction with one or more separate color curves.

An extended range histogram 335 also can be presented in curve display area 305. Extended range histogram 335 can indicate the tonal distribution for a selected color or, if included and selected, for the luminance channel. For instance, green curve 310 can be selected, e.g. through input received from a user, and extended range histogram 335 can depict the tonal distribution of the color green within the corresponding image, e.g. image 175. The tone of a single color also can be adjusted by manipulating a separate color curve. For instance, an anchor 330 on blue curve 315 can be selected and used to move the curve upward or downward in curve display area 305. As a result, the relationship of one or more input values to output values corresponding to positions along blue curve 315 can be changed.

Despite one or more tonal adjustments to one or more curves, including one or more separate color curves, extended range histogram 335 can remain static and can reflect the initial input values of the corresponding image, e.g. image 175. Additionally, extended range histogram 335 can be configured to display the tonal distribution of two or more colors and/or channels. For instance, extended range histogram 335 can be presented as a color overlay histogram, in which a separate histogram is generated for each color and luminance channel included in curve display area 305. Further, a range can be specified for curve display area 305, and thus the one or more included curves and histograms, such as through range selector 145.

Figure 4:
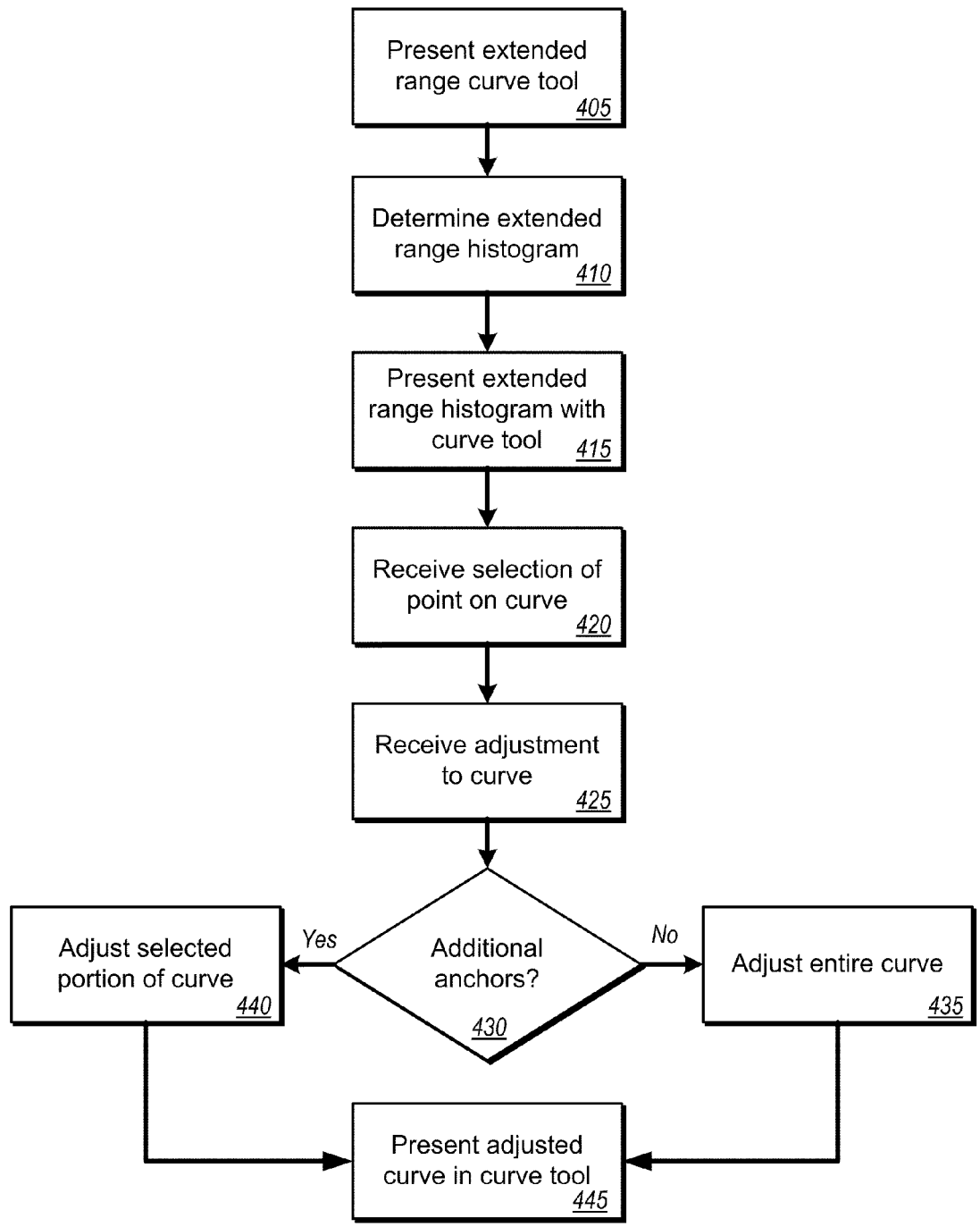
FIG. 4 shows an exemplary process flow for adjusting tonal values using an extended range curve tool.

FIG. 4 shows an exemplary process flow for adjusting tonal values using an extended range curve tool. An extended range curve tool can be presented in an interface (405). For example, the extended range curve tool can be shown in an image processing or image editing application. In some instances, the extended range curve tool can be presented as a separate tool. In some other instances, the extended range curve tool can be presented as a tool (or brick) in an image editing toolbox or palette. The extended range curve tool can be instantiated in accordance with one or more default settings, including default channel and range settings, and/or settings based on an associated image. Further, one or more settings associated with the extended range curve tool can be altered in response to user input.

An extended range histogram for a corresponding image can be determined (410). The image can be a presently selected image, such as an image opened in the image processing or image editing application. Also, the data reflected in the extended range histogram can be determined based on the channel selected in the extended range curve tool. For instance, if the luminance channel is selected in the extended range curve tool, the extended range histogram can be generated based on luminance values of the corresponding image. Alternatively, if a single color channel, e.g. the red channel, is selected, the extended range histogram can be generated based on the tonal distribution of red in the corresponding image.

The extended range histogram is presented in conjunction with the extended range curve tool (415). The extended range histogram can be configured to match the scale of the extended range curve tool. Further, the extended range histogram can be presented in the extended range curve tool, e.g. along the x-axis, such that corresponding values are aligned. Thus, points along the curve presented in the extended range curve tool also can be aligned with corresponding values in the extended range histogram.

A selection of a point along the curve in the extended range curve tool can be received (420). The selection can be specified using any input mechanism, including one or more numerical values or a graphical indication. For example, an on-screen cursor controlled by an input device, e.g. a mouse or a touch screen, can be used to indicate and select a point on the curve. Further, an adjustment to the curve at the selected point also can be received (425). The adjustment can reposition one or more points along the curve vertically, such that the relationship specified by an input value-output value pair is altered.

In processing the received adjustment, it can be determined whether one or more additional anchors have been defined on the curve (430). If no additional anchors have been defined, the adjustment can be applied to the entire curve (435). The magnitude of the adjustment will be greatest at the selected point and will diminish with distance from the selected point. If one or more additional anchors have been defined, the adjustment can be applied to the portion of the curve that includes the selected point and is situated between two anchors or an anchor and an end point (440). The one or more portions of the curve separated from the selected point by an anchor can remain unchanged. The resulting adjusted curve can be presented in the extended range curve tool (445). The adjusted curve can be presented in conjunction with a reference curve, e.g. a diagonal, that indicates the initial relationship between input and output values. Further, additional modifications can be made to at least a portion of the adjusted curve, such as to define a complex curve.

Figure 5:
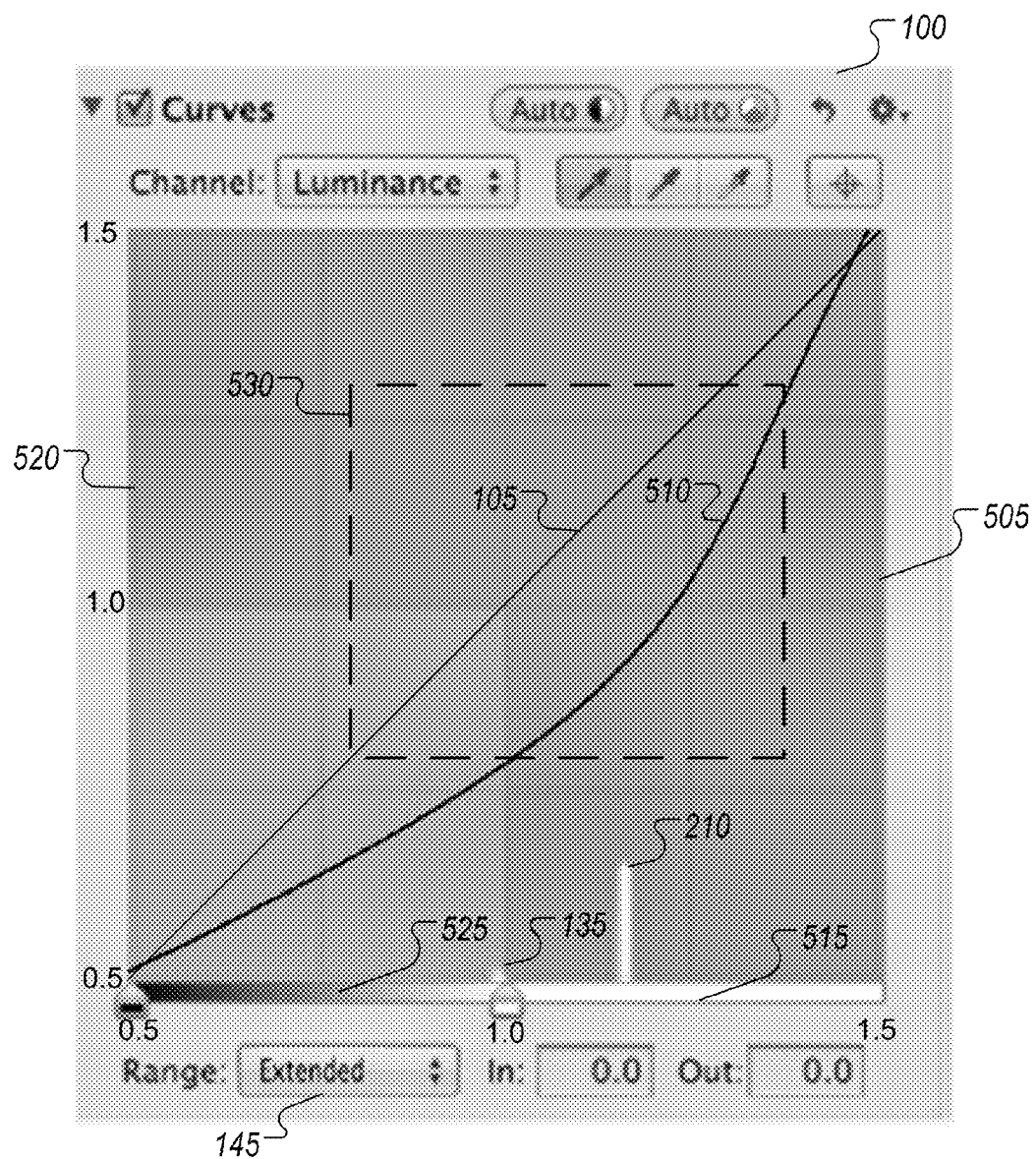
FIG. 5 shows a zoomed view of an exemplary extended range curve tool.

FIG. 5 shows a zoomed view of an exemplary extended range curve tool. The extended range curve tool 100 can be configured to present a user selected range, in addition to the one or more predefined ranges that can be selected using range selector 145. In some implementations, the user selected range can be graphically indicated, such as through a selection box 530 or the placement of crop marks. For example, selection box 530 can be positioned in curve display area 505 and sized to select the area to be displayed. Selection box 530 can be sized by dragging any portion of the box, e.g. a wall or a corner, to increase or decrease the interior area. Further, selection box 530 can be repositioned by dragging-dropping the entire box or by adjusting the size to encompass a specific area. Selection box 530 also can be positioned or resized using any other known interface conventions.

Curve display area 505 can be adjusted to present only the area defined by selection box 530, including a portion of one or more of reference curve 105, curve 510, and extended range histogram 135. Further, selection box 530 also can be displayed in the adjusted view of curve display area 505, such as to permit the selection of another zoom area. For example, an extended range curve and a corresponding extended range histogram can be presented in extended range curve tool 100, covering a range of 0.2. A portion of the full extended range, e.g. 0.5.1.5 can be selected in curve display area 505, using selection box 530. Once the selection has been made, curve display area 505 can be modified to display only the selected range, i.e. 0.5.1.5.

The range of the selected portion displayed in curve display area 505 can be marked along x-axis 515 and y-axis 520. Further, the tonal range of curve display area 505 can be graphically represented in tonal range bar 525. For instance, tonal range bar 525 can depict a mid-range tone at value 0.5, a super-white tone at value 1.5, and gradually transitioning tonal values between them. In addition to displaying the selected portion of curve 510, curve display area 505 also can display any portion of extended range histogram 135 that is included in the selected area. For instance, spike 210 can be presented at a value of approximately 1.2.

Curve 510 also can be adjusted in curve display area 505. By providing a zoomed view of curve 510, more precise adjustments can be made to the curve and adjustments can be more accurately associated with a particular portion of the curve. In some implementations, an adjustment to curve 510 also can cause portions of curve 510 not visible in curve display area 505 to be adjusted. In some other implementations, adjustments to curve 510 can be limited to the portion of the curve that is visible in curve display area 505.

Figure 6:
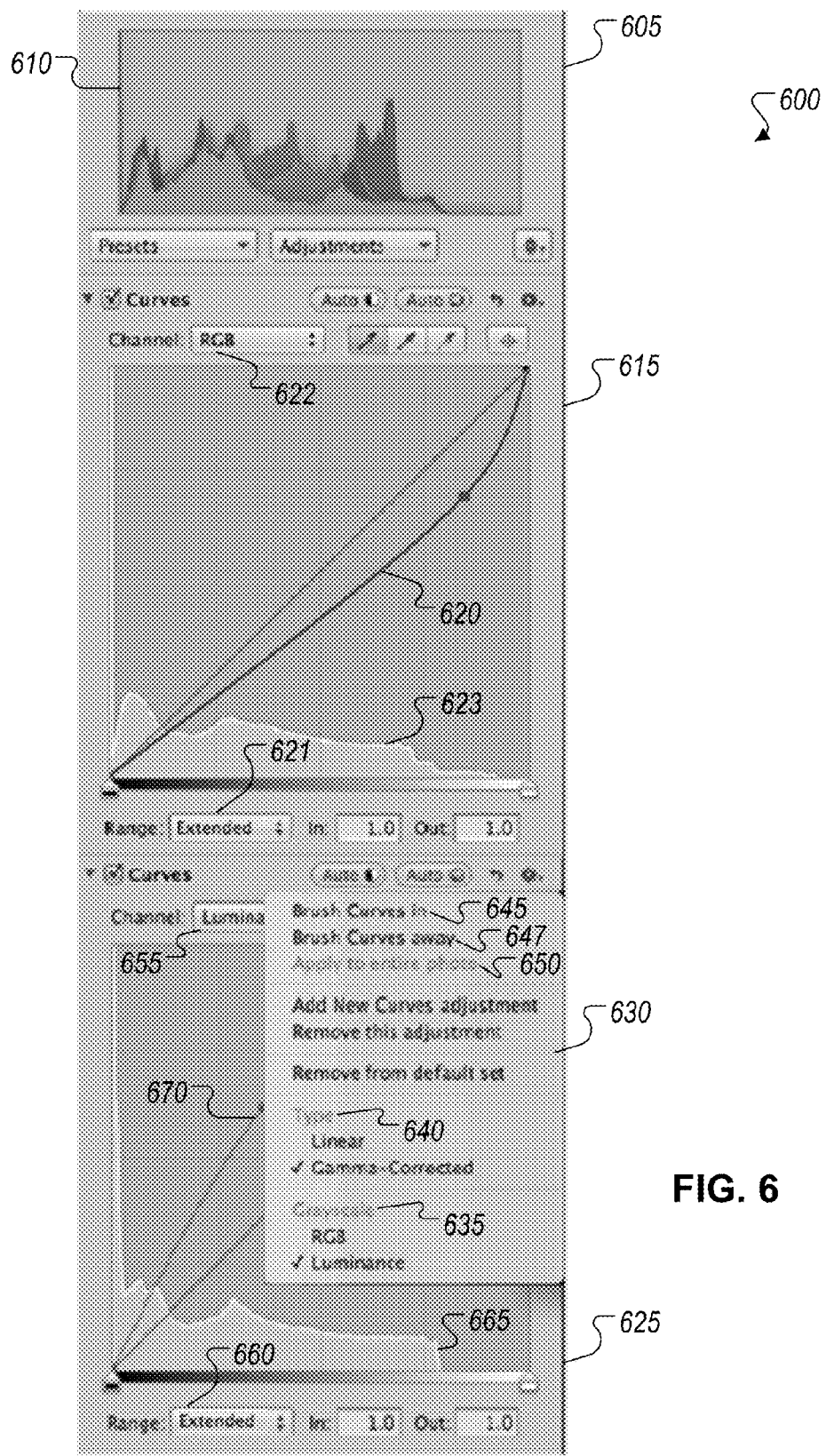
FIG. 6 shows an exemplary toolstrip including multiple instances of an extended range curve tool.

FIG. 6 shows an exemplary toolstrip including multiple instances of an extended range curve tool. A toolstrip 600 (or heads-up-display (HUD)) associated with an image processing or image editing application can include multiple instances of an extended range curve tool, where each instance of the extended range curve tool can be used to make one or more different tonal adjustments to a corresponding image. For example, different instances of the extended range curve tool can be used to work with different channels or different curve types.

Toolstrip 600 can include an output histogram tool 605, which can depict the tonal distribution in a corresponding output image. An output histogram 610 presented in output histogram tool 605 can be determined based on the tonal distribution of the associated image and any image adjustments generated by one or more of the tools included in toolstrip 600. Output histogram 610 can be updated dynamically, in response to each image adjustment that is received. Further, output histogram 610 can be presented as a histogram for a single channel, e.g. luminance, or as an overlay histogram that includes individual histograms corresponding to different channels, e.g. red, green, blue, and luminance.

The multiple instances of the extended range curve tool included in toolstrip 600 can be arranged in any configuration and can be separated by one or more intervening tools. Further, the multiple instances of the extended range curve tool can be configured differently, such that the information presented and the adjustments made can differ between the instances. For example, a first instance of the extended range curve tool 615 can be configured to present a linear curve 620, i.e., a curve for which the tonal values are distributed linearly and have not been modified, such as through gamma correction. One or more other configuration parameters also can be specified with respect to the first instance of the extended range curve tool 615. For example, the range 621 can be set to extended and the channel 622 can be set to RGB. A pop-up menu (not shown) also can be used to configure one or more parameters associated with curve tool 615. Thus, the first instance of extended range curve tool 615 can be configured in any manner permitted by the included parameters.

A histogram 623 also can be presented in conjunction with the first instance of the extended range curve tool 615. Histogram 623 can be determined in accordance with the tonal values of the associated image and one or more parameters corresponding to curve tool 615, such as range. In some implementations, histogram 623 also can reflect adjustments performed using one or more tools that logically precede curve tool 615. The first instance of the extended range curve tool 615 can be used to specify one or more tonal adjustments with respect to the associated image. For instance, linear curve 620 can be adjusted at one or more points.

A second instance of the extended range curve tool 625 also can be included in toolstrip 600. The second instance of the extended range curve tool 625 can be generated in toolstrip 600 at any time, including after one or more adjustments have been made using the first instance of extended range curve tool 615. Curve tool 625 can be independently configured using one or more selectors, e.g. channel selector 655 and range selector 660, as well as through pop-up menu 630. In some implementations, a configuration setting can be specified using either of a dedicated selector or pop-up menu 630. For example, a channel (or grayscale) can be selected using channel selector 655 or a channel menu 635 in pop-up menu 630.

Further, as discussed above, the specified value of one or more configuration parameters associated with curve tool 625 can differ from those of the first instance of the extended range curve tool 615. For instance, a gamma-corrected option in the type menu 640 of pop-up menu 630 can be selected to present a gamma-corrected curve 670, i.e., a curve for which the tonal values have been gamma-corrected. Thus, one or more tonal adjustments based on a gamma-corrected curve can be separately made to the associated image by adjusting gamma-corrected curve 670.

Additionally, the manner in which tonal adjustments specified in a curve tool instance are applied to the associated image also can be separately configured for each instance. Pop-up menu 630 can include one or more adjustment application settings, such as brush curves in 645, brush curves away 647, and apply to entire photo 650. The apply to entire photo 650 setting can be selected to cause a tonal adjustment made to gamma-corrected curve 670 to be applied to the entire associated image. Similarly, selecting the brush curves away 647 setting can cause a tonal adjustment made to gamma-corrected curve 670 to be applied to the entire photo, but also allows the tonal adjustment to be brushed away from one or more portions of the image using a brush tool (not shown) presented in conjunction with the image. Alternatively, selecting the brush curves in 645 setting can cause a tonal adjustment made to gamma-corrected curve 670 to be associated with the brush tool. Further, the brush tool can be used to selectively apply the tonal adjustment to one or more portions of the image, such as high-light or shadow regions.

Figure 7:
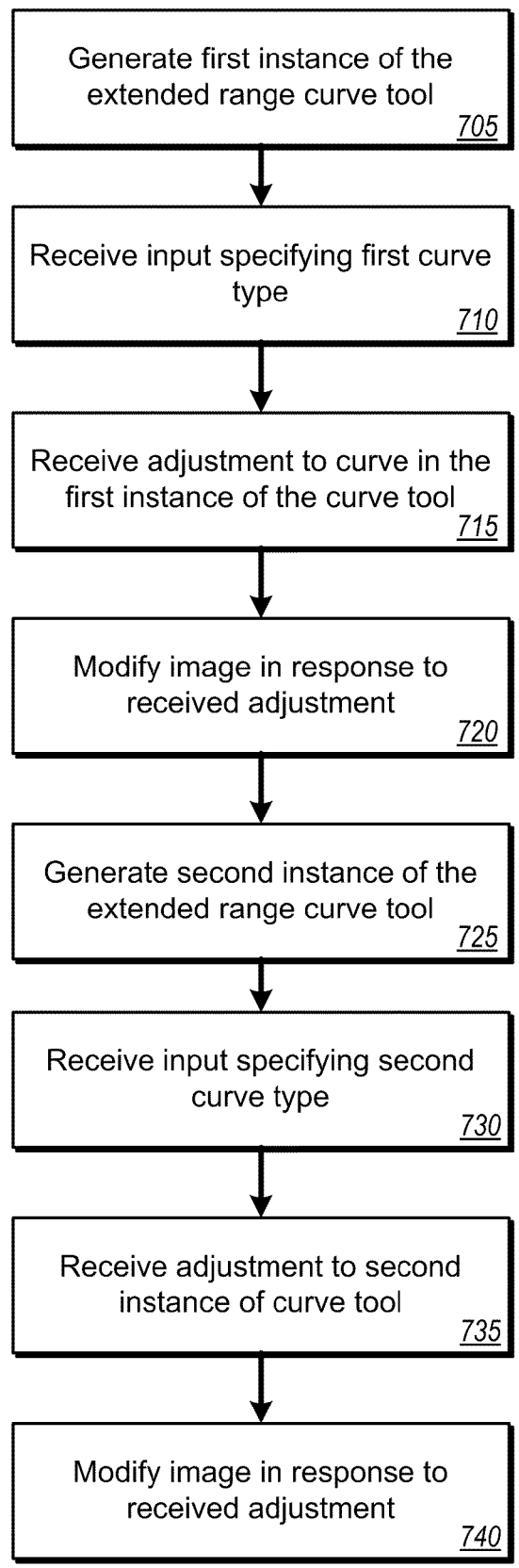
FIG. 7 shows an exemplary process flow for adjusting tonal values using multiple instances of an extended range curve tool.

Multiple instances of an extended range curve tool can be used to perform different tonal adjustments with respect to an image. FIG. 7 shows an exemplary process flow for adjusting tonal values using multiple instances of an extended range curve tool. A first instance of an extended range curve tool can be generated (705). A configuration can be specified for the first instance of the curve tool using one or more configuration parameters. For example, one or more of the range, channel, and application setting can be configured either automatically, e.g. in response to characteristics of the associated image and/or default settings, or manually in response to user input. Further, input can be received, e.g. from a user, specifying the type curve included in the first instance of the curve tool (710). For example, the type of curve can be linear.

One or more adjustments to the curve can be received in the first instance of the curve tool (715). The adjustments can be made by modifying at least a portion of the curve, such as by repositioning one or more anchors on the curve. In one example, the associated image can include tonal data in the extended range, which can be adjusted to fall within the standard range of 0 . . . 1. A linear curve can be used to process the extended range data, as the linear representation does not compress tonal data in the white to super-white range. Further, in processing the extended range data, one or more adjustments can be made to at least the portion of the linear curve that corresponds to the extended range, such as by pulling the curve downward to reduce the output values corresponding to the extended range. In another example, the first instance of the curve tool can receive tonal adjustments to be applied to the entire image, such as one or more conservative adjustments. The associated image can be modified in response to the adjustments received by the first instance of the extended range curve tool (720).

A second instance of an extended range curve tool also can be generated (725). The second instance can be generated before, after, or contemporaneously with the first instance. The configuration of the second instance of the curve tool can differ from that of the first instance of the curve tool. As a result, the second instance can be used to make different adjustments to the associated image. Input, e.g. from a user, specifying the type curve included in the second instance of the curve tool also can be received (730). For example, input specifying or otherwise selecting a gamma-corrected curve can be received. The gamma-corrected curve can be adapted to conform to human tonal perception, e.g. such that whites are compressed and shadows are expanded in relation to a linear curve.

One or more adjustments to the curve can be received in the second instance of the curve tool (735). As with the first instance, the adjustments can be made by modifying at least a portion of the curve, such as by repositioning one or more anchors on the curve. In one example, the first instance of the curve tool can have a linear curve that is adjusted to redistribute tonal data from the extended range into the standard range. The gamma-corrected curve of the second instance of the curve tool can then be used to adjust the tonal data in the standard range. In another example, the second instance of the curve tool can receive tonal adjustments to be applied to selected portions of the image, such as through brushing. Thus, adjustments to the curve in the second instance of the curve tool can be more aggressive, such as to produce intense shadows or highlights. The associated image can be modified, at least partially, in response to the adjustments received by the second instance of the extended range curve tool (740).

FIG. 8 shows an exemplary computing system for implementing an extended range curve tool. Computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 800 includes processor 810, memory 820, storage device 830, and high-speed interface 850. Further, computing device 800 can include one or more high-speed expansion ports (not shown) and a low speed interface (not shown) connected to a low speed bus (not shown), which can interface with one or more included components, such as storage device 830. Processor 810 can be configured to process instructions for execution within computing device 800, including instructions stored in memory 820 or on storage device 830, to display graphical information for a GUI on an external input/output device, such as display 840 coupled to input/output interface 860. In other implementations, multiple processors and/or multiple buses can be used, as appropriate, along with multiple memories and types of memory. Also, multiple computing devices 800 can be connected, with each device providing one or more portions of the necessary operations (e.g., as a server bank, a group of blade servers, or a multi-processor system).

Memory 820 can be configured to store information within computing device 800. For instance, memory 820 can be a computer-readable medium, such as one or more volatile or non-volatile memory units. Storage device 830 is capable of providing mass storage for computing device 800. For instance, storage device 830 can be a computer-readable medium, such as a floppy disk device, a hard disk device, an optical disk device, a tape device, a flash memory or other similar solid state memory device, or an array of devices, including devices in a storage area network. In some implementations, a computer program product can be tangibly embodied in an information carrier. The computer program product can contain instructions that, when executed, perform one or more methods, such as those described above.

The information carrier can be, e.g., a computer- or machine-readable medium, such as memory 820, storage device 830, or memory on processor 810.

A high speed controller can be configured to manage bandwidth-intensive operations for computing device 800, while a low speed controller can be configured to manage less bandwidth-intensive operations. Such allocation of duties is exemplary only. In some implementations, the high-speed controller is coupled to memory 820, display 840 (e.g., through a graphics processor or accelerator), and to high-speed expansion ports (not shown), which can accept various expansion cards (not shown). Further, the low-speed controller (not shown) can be coupled to storage device 830 and one or more low-speed expansion ports (not shown). A low-speed expansion port can be one of various communication ports (e.g., USB, Bluetooth, Ethernet, wireless Ethernet) and further can be coupled to one or more input/output devices, such as a keyboard, a pointing device, a scanner, or a networking device such as a switch or router, e.g., through a network adapter.

Computing device 800 can be implemented in a number of different forms, as shown in FIG. 8. For example, it can be implemented as server 865 or as several of such servers. Computing device 800 also can be implemented as one or more portions of rack server system 870. Additionally or alternatively, computing device 800 can be implemented as a personal computer, such as laptop computer 880.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium, which can be a machine-readable storage device, a machine-readable storage substrate, a memory device, a composition of matter effecting a machine-readable propagated signal, or any combination thereof.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or any combination thereof.

A computer program (also referred to as a program, software, software application, script, or code) can be written in any form of programming language, including compiled or interpreted languages, or declarative or procedural languages, and can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows also can be performed by, and apparatus also can be implemented as, special purpose logic circuitry, e.g., an FPGA (field programmable gate array), PLD (programmable logic device) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory, a random access memory, or both. A computer includes a processor for performing instructions and one or more memory devices for storing instructions and data. Generally, a computer also will include, or be operatively coupled to receive data from or transfer data to, or both, one or more mass storage devices for storing data, e.g., magnetic, magneto-optical, or optical disks. However, a computer need not have such devices. Moreover, a computer can be embedded in another device.

Computer-readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, the processor and memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), or OLED (organic light emitting diode) monitor, for displaying information to the user and a keyboard, and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of one or more computer programs running on the respective computers.

While this disclosure contains specific implementations, these should not be construed as limitations on the scope of any claims, but rather as descriptions of features that may be specific to particular exemplary implementations. Certain features that are described in the context of separate embodiments also can be implemented in combination in a single embodiment. Conversely, various features that are described in the context of a single embodiment also can be implemented separately in multiple embodiments or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing can be advantageous. Moreover, the separation of various system components in the embodiments described above should not be understood as requiring such separation in all embodiments and it should be understood that the described program components and systems can generally be integrated together in a single software product or packaged into multiple software products.

Only a few implementations and examples are described, and other implementations, enhancements, and variations can be made based on what is described and illustrated in this disclosure.

What is claimed is:

1. A non-transitory computer-readable medium storing instructions executable by data processing apparatus to perform operations comprising:
   accessing a digital image having associated tonal data, including tonal data in an extended range beyond a normalized value of 1.0;
   instantiating an instance of an extended range curve tool corresponding to the digital image that includes a curve defining a relationship between input tonal values and output tonal values, wherein at least a portion of the input tonal values and output tonal values are associated with the extended range;
   generating an extended range histogram based on the tonal data associated with the digital image, the extended range histogram including data corresponding to the extended range; and
   presenting the extended range histogram in conjunction with the instance of the extended range curve tool.

2. The medium of claim 1, the operations comprising:
   selectively configuring the curve to correspond to a luminance channel or an equal weight RGB channel.

3. The medium of claim 2, the operations comprising:
   presenting, in the instance of the extended range curve tool, another curve that corresponds to a single color channel.

4. The medium of claim 1, the operations comprising:
   receiving user input specifying an adjustment to at least a portion of the curve; and
   presenting a modified curve in response to the specified adjustment.

5. The medium of claim 1, the operations comprising:
   receiving user input specifying a portion of the curve to be viewed in more detail; and
   presenting an expanded view of the specified portion of the curve.

6. The medium of claim 5, the operations comprising:
receiving, in the expanded view, user input indicating an adjustment to at least a portion of the curve.

7. The medium of claim 1, the operations comprising:
configuring the curve type to be either of linear and gamma-corrected.

8. The medium claim 1, the operations comprising:
instantiating a second instance of the extended range curve tool corresponding to the digital image, wherein at least one configuration parameter differs between the instances of the extended range curve tool.

9. A non-transitory computer-readable medium storing instructions executable by data processing apparatus to perform operations comprising:
accessing a digital image have associated tonal data;
generating an extended range curve tool corresponding to the digital image, the extended range curve tool having a curve defining a relationship between input tonal values and output tonal values, including tonal values associated with an extended range beyond a normalized value of 1.0;
receiving user input specifying a configuration setting corresponding to the extended range curve tool; and
presenting the extended range curve tool in accordance with the specified configuration setting.

10. The medium of claim 9, wherein the extended range curve tool is included in a tool strip having at least one additional image adjustment tool.

11. The medium of claim 10, the operations comprising:
generating an output histogram based at least in part on output tonal values associated with the extended range curve tool; and
presenting the output histogram in the tool strip.

12. The medium of claim 9, the operations comprising:
generating an extended range histogram in accordance with tonal data associated with the digital image; and
presenting the extended range histogram in the extended range curve tool.

13. The medium claim 9, wherein receiving user input specifying a configuration setting comprises:
selectively configuring the curve to correspond to a luminance channel or an equal weight RGB channel.

14. The medium claim 9, wherein receiving user input specifying a configuration setting comprises:
receiving user input selecting one of a plurality of predetermined tonal value range settings.

15. The medium claim 9, the operations comprising:
receiving user input specifying an adjustment to at least a portion of the curve; and
presenting a modified curve in response to the specified adjustment.

16. The medium claim 15, the operations comprising:
associating the specified adjustment with a brush tool.

17. The medium claim 16, wherein the brush tool is configured to brush the specified adjustment out of the digital image.

18. A method of adjusting an image, the method comprising:
accessing a digital image have associated tonal data, including tonal data in an extended range beyond a normalized value of 1.0;
instantiating an instance of an extended range curve tool corresponding to the digital image that includes a curve defining a relationship between input tonal values and output tonal values, wherein at least a portion of the input tonal values and output tonal values are associated with the extended range;
generating an extended range histogram in accordance with the tonal data associated with the digital image, the extended range histogram including data corresponding to the extended range; and
presenting the extended range histogram in conjunction with the instance of the extended range curve tool.

19. The method of claim 18, further comprising:
receiving user input specifying an adjustment to at least a portion of the curve;
generating a modified curve in response to the specified adjustment; and
presenting the modified curve in the instance of the extended range curve tool.

20. The method of claim 19, further comprising:
generating an output histogram based at least in part on output values associated with the instance of the extended range curve tool; and
presenting the output histogram and the instance of the extended range curve tool separately.

21. The method of claim 18, further comprising:
receiving user input configuring the curve to correspond to a luminance channel or an equal weight RGB channel.

22. The method of claim 18, further comprising:
configuring the curve type to be either of linear and gamma-corrected.

23. The method of claim 18, further comprising:
receiving user input specifying a portion of the curve to be viewed in more detail; and
presenting, in the instance of the extended range curve tool, an expanded view of the specified portion of the curve.

24. The method of claim 23, further comprising:
receiving, in the expanded view, user input indicating an adjustment to at least a portion of the curve; and
modifying the curve in response to the indicated adjustment, including at least a portion of the curve not presented in the expanded view.

25. The method of claim 18, further comprising:
instantiating a second instance of the extended range curve tool having a second curve corresponding to the digital image, wherein at least one configuration parameter differs between the instances of the extended range curve tool; and
receiving user input, in the second instance of the extended range curve tool, specifying an adjustment to at least a portion of the second curve.

26. The method of claim 25, further comprising:
associating the specified adjustment with a brush tool configured to brush the specified adjustment into one or more portions of the digital image.

* * * * *

UNITED STATES PATENT AND TRADEMARK OFFICE
CERTIFICATE OF CORRECTION

PATENT NO. : 8,433,135 B2
APPLICATION NO. : 12/610852
DATED : April 30, 2013
INVENTOR(S) : Nikhil Bhatt It is certified that error appears in the above-identified patent and that said Letters Patent is hereby corrected as shown below:

In the Claims

In Column 17, In Line 7, In Claim 8, delete "The medium claim 1," and insert -- The medium of claim 1, --, therefor.

In Column 17, In Line 37, In Claim 13, delete "The medium claim 9," and insert -- The medium of claim 9, --, therefor.

In Column 17, In Line 41, In Claim 14, delete "The medium claim 9," and insert -- The medium of claim 9, --, therefor.

In Column 17, In Line 45, In Claim 15, delete "The medium claim 9," and insert -- The medium of claim 9, --, therefor.

In Column 17, In Line 50, In Claim 16, delete "The medium claim 15," and insert -- The medium of claim 15, --, therefor.

In Column 17, In Line 52, In Claim 17, delete "The medium claim 16," and insert -- The medium of claim 16, --, therefor.

Signed and Sealed this
Twelfth Day of November, 2013

Teresa Stanek Rea
*Deputy Director of the United States Patent and Trademark Office*